United States Patent
Chang et al.

(10) Patent No.: US 11,037,189 B2
(45) Date of Patent: *Jun. 15, 2021

(54) PROMOTION SYSTEM FOR DETERMINING AND CORRECTING FOR INSUFFICIENCY OF PROMOTION DATA

(71) Applicant: Groupon, Inc., Chicago, IL (US)

(72) Inventors: Kevin Chang, Mountain View, CA (US); Amit Aggarwal, Los Altos, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,111

(22) Filed: Jun. 11, 2019

(65) Prior Publication Data

US 2020/0005352 A1 Jan. 2, 2020

Related U.S. Application Data

(63) Continuation of application No. 13/839,036, filed on Mar. 15, 2013, now Pat. No. 10,360,580.

(51) Int. Cl.
*G06Q 30/02* (2012.01)
(52) U.S. Cl.
CPC .............................. *G06Q 30/0242* (2013.01)
(58) Field of Classification Search
CPC .................................................. G06Q 30/0242
USPC ........................................................ 705/14.41
See application file for complete search history.

(56) References Cited

U.S. PATENT DOCUMENTS

| | | | |
|---|---|---|---|
| 7,904,337 B2* | 3/2011 | Morsa ................ | G06Q 30/0275 705/14.71 |
| 10,325,284 B1 | 6/2019 | Aggarwal et al. | |
| 2012/0166267 A1* | 6/2012 | Beatty ................ | G06Q 30/0219 705/14.21 |
| 2012/0278172 A1* | 11/2012 | Mercuri ................. | G06Q 30/02 705/14.58 |
| 2013/0073381 A1* | 3/2013 | Binkley ................. | G06Q 30/02 705/14.48 |
| 2013/0179264 A1* | 7/2013 | Wilson ................... | G06Q 30/02 705/14.58 |
| 2013/0231999 A1* | 9/2013 | Emrich .............. | G06Q 30/0271 705/14.43 |
| 2013/0268328 A1* | 10/2013 | Kurapati ............ | G06Q 30/0207 705/14.1 |

(Continued)

OTHER PUBLICATIONS

Ad-me Wireless Advertising Adapted to the User Location, Device and Emotions (Year: 2004).*

(Continued)

*Primary Examiner* — Gautam Ubale
(74) *Attorney, Agent, or Firm* — Alston & Bird LLP

(57) ABSTRACT

A promotion system for determining a deficiency in promotion data and correcting for the deficiency is disclosed. Issuing offers from a promotion program results in promotion data being generated. The promotion data may be analyzed to determine an acceptance rate of the offers. The promotion system may compare whether the acceptance rate is above a predetermined threshold, but has a confidence level that is less than a confidence rate threshold. In that event, the promotion system may issue additional offers in order to increase the confidence level associated with the acceptance rate by a predetermined amount.

24 Claims, 7 Drawing Sheets

(56) References Cited

U.S. PATENT DOCUMENTS

2018/0330387 A1\* 11/2018 Harris ................ G06Q 30/06
2019/0355013 A1 11/2019 Aggarwal et al.

OTHER PUBLICATIONS

An Integrated Architecture for Notification System to enhance the efficiency of mobile marketplace (Year: 2011).\*
Analysis of the Actual Response Rates in Mobile Advertising (Year: 2006).\*
Method and System for Localized and Targeted Advertising on Mobile Devices (Year: 2010).\*
U.S. Appl. No. 13/411,502, filed Mar. 2, 2012; first named inventor: O'Brien, entitled Relevance System for Consumer Deals.
U.S. Appl. No. 13/839,142, filed Mar. 15, 2013; first named inventor: Aggarwal, entitled Throttling System for Consumer Deals.
U.S. Appl. No. 61/695,857, filed Aug. 31, 2012, first named inventor: Aggrawal, entitled Promotion Offering System.

\* cited by examiner

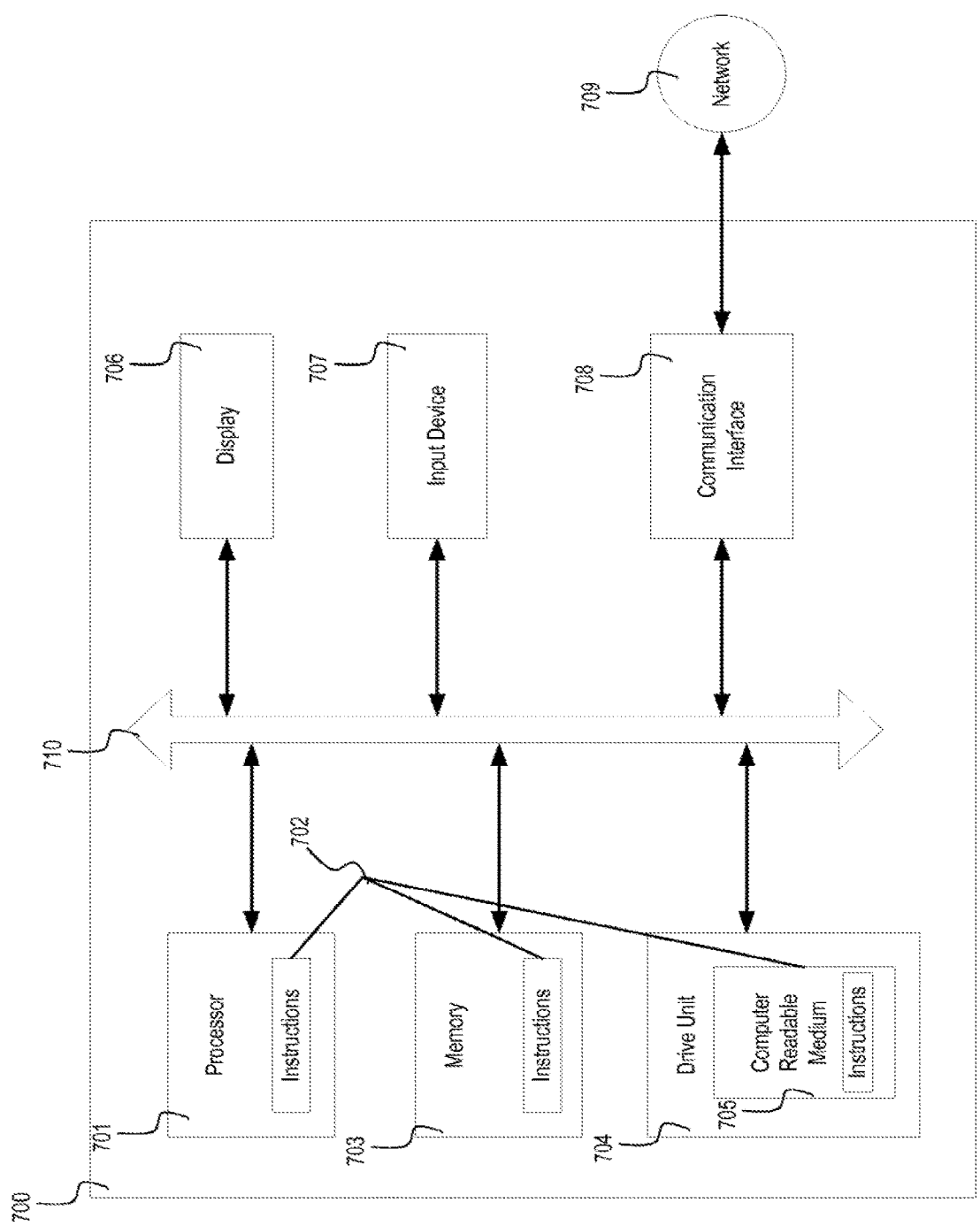

PROMOTION SYSTEM FOR DETERMINING AND CORRECTING FOR INSUFFICIENCY OF PROMOTION DATA

CROSS REFERENCE TO RELATED APPLICATION

This application is a continuation of U.S. application Ser. No. 13/839,036, titled "PROMOTION SYSTEM FOR DETERMINING AND CORRECTING FOR INSUFFICIENCY OF PROMOTION DATA" filed Mar. 15, 2013, the content of which is incorporated herein by reference in its entirety.

FIELD OF THE INVENTION

The present description relates to offering promotions associated with a product or a service. This description more specifically relates to identifying whether feedback to promotion offers are insufficient, and for correcting for the insufficiency in the feedback.

DESCRIPTION OF THE RELATED ART

Merchants typically offer promotions to consumers from time to time in order to generate more business. The promotions offered may be in the form of discounts, deals, rewards or the like. Often times, there are a multitude of promotions that may be offered to the consumer, with the promotions potentially being of different types (e.g., a restaurant promotion versus a spa promotion). The consumers respond to the offers for the promotions in the form of feedback. The feedback may include ignoring the promotion offer, opening the promotion offer but not buying the promotion included therein, or buying the promotion. It may be difficult to determine whether the feedback received from the offers is insufficient and how to correct for any perceived insufficiency.

SUMMARY OF THE INVENTION

An apparatus and method for analyzing collections of promotions is disclosed.

According to one aspect, a method is provided for determining whether and how many additional offers to make for a promotion from a promotion program. The method includes: analyzing feedback from previous offers sent to consumers for the promotion program; determining, based on the analysis, an estimated acceptance correlated to an attribute, the attribute comprising or derived from one or both of a consumer attribute or a promotion attribute; determining whether the estimated acceptance is above a predetermined acceptance threshold; determining a number of additional consumers having the attribute to send the promotion to in order to increase confidence in the estimated acceptance; and determining whether to send the promotion to some or all of the number of additional consumers based on whether the estimated acceptance is above the predetermined acceptance threshold.

According to another aspect, a method is provided for determining whether to present an offer from a promotion program to a consumer. The method includes: accessing a value of an attribute, the attribute comprising or derived from a consumer attribute or a promotion attribute; generating, using a historical predictive model, a historical predicted acceptance of the offer, the historical predictive model configured to input the value and to output the historical predicted acceptance, the historic predictive model using performance data of offers from different promotion programs in order to correlate historical predicted acceptances to respective values of the attribute; generating, using a promotion program predictive model, a promotion program predicted acceptance of the offer, the promotion program predictive model configured to input the value and to output the promotion program predicted acceptance, the promotion program predictive model using performance data from previous offers from the promotion program to correlate promotion program predicted acceptances to respective values of the attribute; adjusting the promotion program predicted acceptance based on confidence in the performance data from the previous offers from the promotion program; combining the historical predicted acceptance and the adjusted promotion program predicted acceptance in order to generate a predicted acceptance of the offer; and using the predicted acceptance in order to determine whether to present an offer from the promotion program to the consumer.

According to yet another aspect, a system is provided for determining whether and how many additional offers to make for a promotion from a promotion program. The system includes: one or more memories configured to store a consumer attribute and a promotion attribute; and a processor in communication with the one or more memories. The processor is configured to: analyze feedback from previous offers sent to consumers for the promotion program; determine, based on the analysis, an estimated acceptance correlated to an attribute, the attribute comprising or derived from one or both of the consumer attribute or the promotion attribute; determine whether the estimated acceptance is above a predetermined acceptance threshold; determine a number of additional consumers having the attribute to send the promotion to in order to increase confidence in the estimated acceptance; and determine whether to send the promotion to some or all of the number of additional consumers based on whether the estimated acceptance is above the predetermined acceptance threshold.

According to still another aspect, a system is provided for determining whether to present an offer from a promotion program to a consumer. The system includes: one or more memories configured to store performance data from previous offers from the promotion program and performance data of offers from different promotion programs; and a processor in communication with the one or more memories. The processor is configured to: access a value of an attribute, the attribute comprising or derived from a consumer attribute or a promotion attribute; generate, using a historical predictive model, a historical predicted acceptance of the offer, the historical predictive model configured to input the value and to output the historical predicted acceptance, the historic predictive model using the performance data of offers from different promotion programs in order to correlate historical predicted acceptances to respective values of the attribute; generate, using a promotion program predictive model, a promotion program predicted acceptance of the offer, the promotion program predictive model configured to input the value and to output the promotion program predicted acceptance, the promotion program predictive model using the performance data from previous offers from the promotion program to correlate promotion program predicted acceptances to respective values of the attribute; adjust the promotion program predicted acceptance based on confidence in the performance data from the previous offers from the promotion program; combine the historical predicted acceptance and the adjusted promotion program predicted acceptance in order to generate a predicted acceptance of the offer; and use the predicted acceptance in order to determine whether to present an offer from the promotion program to the consumer.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 7 is a general computer system, programmable to be a specific computer system, which may represent any of the computing devices referenced herein.

DETAILED DESCRIPTION

Figure 1:
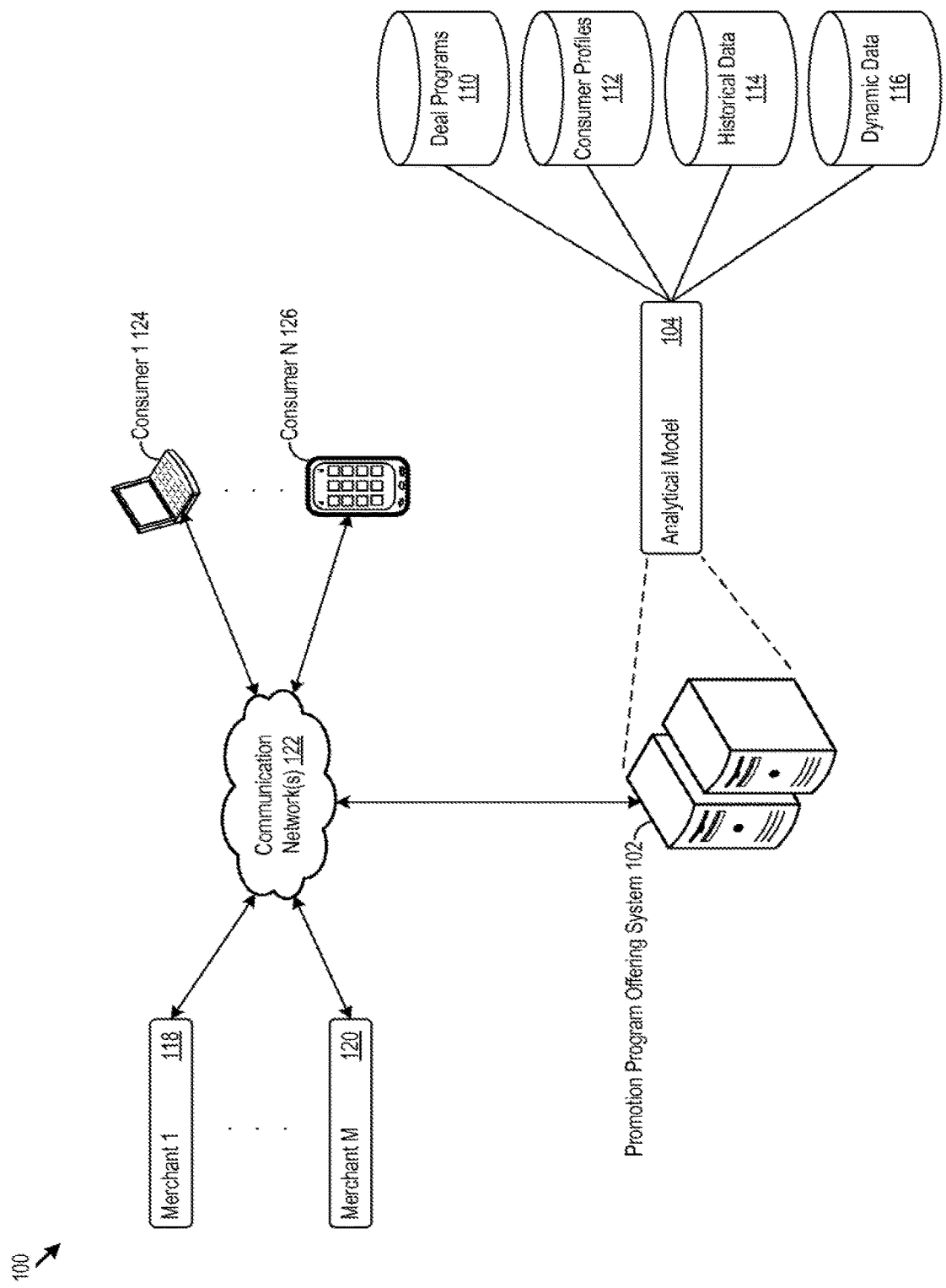
FIG. 1 shows an example of a system that includes an analytical model, which identifies whether feedback from performance offers is insufficient and at least partially corrects for the insufficiency.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

A promotion program offering system 102 may offer promotions from a promotion program. The promotion may include any type of reward, discount, coupon, credit, deal, voucher or the like used toward part or all of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., merchant 1 118, which may be identified as "XYZ coffee shop"), the redemption location of the promotion, the amount of the promotion, the category of the promotion (such as a restaurant promotion, a spa promotion, a travel promotion, a local promotion, etc.), the subcategory of the promotion (such as a sushi restaurant), or the like.

As discussed below, the promotion program offering system 102 may present to a consumer an electronic communication with a promotion. The electronic communication may comprise, without limitation, an email, SMS text message, webpage inbox message, VOIP voice message, real-time webpage content presentation, mobile push notifications or other similar types of electronic correspondences. In order to determine whether to send a promotion to a consumer, one or more attributes of the consumer may be examined. Similar to promotions, a consumer may be identified by one or more attributes. As discussed in more detail below, the attributes for consumers may be stored in respective consumer profiles within consumer profiles database 112. The attributes may include, for instance, the name, age, gender, addresses (e.g., home, work, addresses of interest), occupation, educational background, previously accepted promotion program offerings, previously rejected promotion program offerings, and the like.

In addition to promotion attributes and consumer attributes, other attributes may be derived from one or both of the promotion attributes and the consumer attributes. For example, a distance attribute is defined as the distance between the location of the promotion and the location of the consumer (such as the home location or work location of the consumer). The distance attribute may thus be derived from the promotion location attribute and from the consumer location attribute. As another example, a direction attribute may indicate the direction of the consumer from the promotion location (e.g., east, west, north, or south from the promotion location). Attributes, such as promotion attributes, consumer attributes, and derived attributes are discussed in U.S. application Ser. No. 13/411,502 and U.S. Provisional Application No. 61/695,857, both of which are incorporated by reference herein.

In response to offering promotions, the promotion program offering system 102 may receive feedback. The feedback may come in one of several forms and may provide an indication of success of offering the promotion. One form comprises acceptances (e.g., purchases) of promotions. Another form comprises access of the promotion (e.g., an indication that the consumer activated a link to a webpage describing the promotion). In this regard, the feedback may be compiled as an indication of success or acceptance. One example of an indication of success or acceptance of the promotion is a conversion rate. The conversion rate is the rate by which a consumer accepts a promotion that is offered, or the number of purchases of the promotion divided by the number of times the promotion is offered to consumers. Other indications of success or acceptance are contemplated. The discussion below, while focused on conversion rate, may be equally applied to any indication of success or acceptance.

The feedback may be organized and correlated to one or more attributes, such as correlated to one or more promotion attributes, one or more consumer attributes and/or one or more derived attributes. For example, one attribute may comprise distance of the consumer from the promotion. Different values of distance of the consumer to the promotion (e.g., 0-2 miles, 2-4 miles, etc.) may be correlated to the conversion rate of consumers that meet this attribute. As discussed in more detail below, different predictive models may correlate attribute(s) with the organized feedback. One example is a historical predictive model, which correlates attribute(s) with conversion rates being based on feedback of historical promotions, discussed in more detail below. Another example is a promotion program predictive model, which correlates attribute(s) with conversion rates, with the conversion rates being based on feedback from offers for the promotion program.

As another example, multiple attributes may include the category, the subcategory and the distance of the consumer from the promotion. In the case of the historical predictive model, the multiple attributes may be correlated to calculated conversion rates for historical promotions that have the corresponding multiple attributes. In this regard, the historical predictive model may input values for the multiple attributes (such as category=restaurant; subcategory=sushi; distance=0-2 miles) and output the corresponding conversion rate.

Similar to the historical predictive model, the promotion program predictive model may input values for one or more attributes and output a conversion rate. As discussed above, the conversion rate may indicate an estimated acceptance of the promotion for the correlated attributes. In certain instances, the conversion rate may be unreliable. In this regard, the conversion rate, as an estimated acceptance of the promotion for the correlated attributes, may deviate from the actual acceptance of the promotion for the correlated attributes. In the example of the promotion program predictive model correlating values of distance to conversion rates, a value of 0-2 miles may indicate a conversion rate of 10%. However, due to unreliability of the feedback upon which the conversion rate of 10% is based, the actual conversion rate for a distance of 0-2 miles is actually 5%.

One basis for unreliability of the conversion rate may be the number of offers upon which the feedback (and in turn, the conversion rate) is based. For example, the number of offers for the promotion may be too low to provide a reliable conversion rate. In one aspect, the promotion program offering system 102 is configured to determine which conversion rates show promise, and configured to determine a number of additional offers to increase the reliability of the conversion rate to a predetermined level, as discussed below. In another aspect, the promotion program offering system 102 is configured to combine a historical conversion rate (generated from the historical predictive model) and a promotion program conversion rate (generated from the promotion program predictive model) to generate a predicted conversion rate. Prior to combining, the promotion program conversion rate may be adjusted based on a confidence (e.g., a measure of the reliability or unreliability) in the promotion program conversion rate, as discussed in more detail below with respect to FIG. 6.

FIG. 1 shows an example of a system 100 for determining and at least partly correcting for insufficiency of promotion data. The system 100 includes a promotion program offering system 102, which communicates via one or more networks 122 with one or more consumers, such as consumer 1 124, consumer N 126, and more. For example, the promotion program offering system 102 may communicate with consumers by sending electronic promotion correspondence to a consumer device, such as a laptop computer used by consumer 1 124, a mobile telephone used by consumer N 126, or any other electronic device that can receive electronic promotion correspondence. The promotion program offering system 102 may communicate with one or more merchants, such as the merchants labeled in FIG. 1 as merchant 1 118 and merchant M 120.

The promotion program offering system 102 includes an analytical model 104 that is in communication with databases 110, 112, 114, 116. The analytical model 104 may include one or more components, logic, or circuitry for grouping a number of promotions. The analytical model 104 may further include one or more components, logic, or circuitry for generating electronic promotion correspondence that includes one or more promotions.

A promotion may be characterized by a promotion score. The analytical model 104 may generate a promotion score for a promotion, including a consumer-specific promotion score based on one or more attributes, historical data, or other characteristics of the consumer and/or the promotion. In one implementation, the promotion score of a promotion may be a probability indicator of estimation that the particular consumer accepting (e.g., purchasing) the promotion.

To generate promotion scores, the analytical model 104 may access data with respect to a particular consumer, a particular promotion, or both. The analytical model 104 may communicate with multiple databases of the promotion program offering system 102 such as a promotion program database 110, consumer profiles database 112, historical data database 114 and dynamic data database 116. With respect to the particular consumer, the analytical model 104 may access the databases 110, 112, 114 and 116 in order to obtain specific attribute information on the particular consumer and the various promotions being scored. As discussed above, various attributes may be associated or assigned to a promotion and a consumer in the promotion system 100. The analytical model 104 may use obtained attribute information to generate promotion scores for each promotion. An example of scoring promotions is disclosed in U.S. application Ser. No. 13/411,502, incorporated by reference herein in its entirety. An example for scoring a grouping of promotions is disclosed in U.S. Provisional Application No. 61/663,508, incorporated by reference herein in its entirety.

The promotion programs database 110 may store data detailing various promotions and promotion programs available for offer in the promotion program offering system 102. In order to input promotion program information into the promotions program database 110, merchants (e.g., merchant 1 118) may communicate through the communication networks 122 with the promotion program offering system 102 to input the information detailing the various promotion program offerings.

The consumer profiles database 112 may store consumer profiles for consumers, such as consumer 1 124 and consumer N 126. The analytical model 104 may use one, some, or all of the attributes of the consumer in managing the electronic correspondence cadence of the consumer and/or determining whether to send an electronic promotion correspondence to the consumer.

The historical data database 114 may store data of previously offered promotion programs, such as performance detailing the past performance of promotion program offerings presented by the promotion program system 102. The historical data database 114 may include, as examples, rates of acceptances of specific promotion programs, attributes of consumers that accepted or rejected specific promotion programs, and the like.

The dynamic data database 116 may store data of presently active promotion programs, such as performance data of a promotion program offering that is currently active in the promotion offering system 102. While a promotion program referenced in the dynamic data database 116 is currently active, the data stored in the dynamic data database 116 may pertain to performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Figure 2:
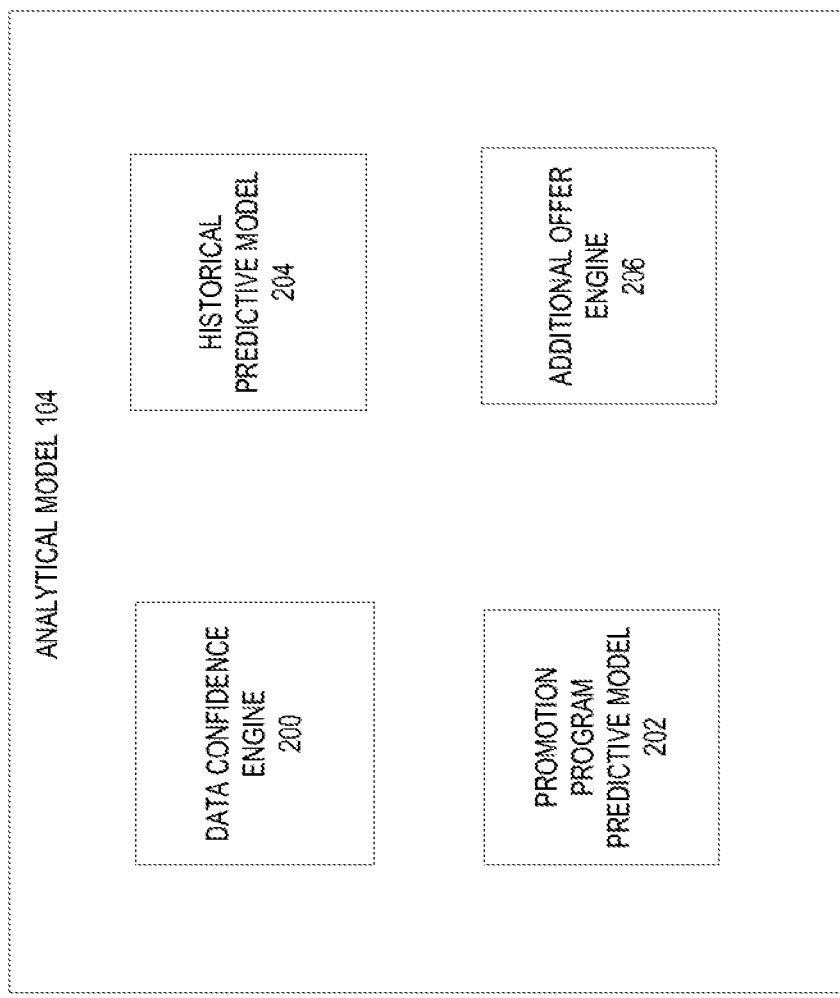
FIG. 2 shows an expanded block diagram of the analytical model illustrated in FIG. 1.

FIG. 2 shows an expanded block diagram of the analytical model 104 illustrated in FIG. 1. The analytical model 104 may be segmented functionally as shown in FIG. 2 into a data confidence engine 200, a promotion program predictive model 202, a historical predictive model 204, and an additional offer engine 206. FIG. 2 is provided for illustration purposes. The division of functionality may differ from that illustrated in FIG. 2.

As discussed above, the promotion program predictive model 202 correlates attribute(s) with the conversion rates being based on feedback from offers for the promotion program. The promotion program predictive model 202 is configured to input values for the attribute(s) and output the conversation rate correlated to the attribute(s).

Likewise, the historical predictive model 204 correlates attribute(s) with conversion rates, with the conversion rates being based on feedback from offers for the historical promotion programs. The historical predictive model 204 is configured to input values for the attribute(s) and output the conversation rate correlated to the attribute(s).

The data confidence engine 200 is configured to determine an indication of confidence (such as a level of confidence) in the conversion rate output by the promotion program predictive model 202. As discussed above, the conversion rate correlated to particular values for attribute(s) is determined based on the promotion offers that include the particular values for the attribute(s). The indication of confidence may be based on the number of the promotion offers that include the particular values for the attribute(s). For example, a first conversion rate for a first promotion correlated to a distance attribute value of 0-2 miles may comprise 10%, and is based on 10 offers (1 acceptance from the 10 offers for the first promotion). A second conversion rate for a second promotion correlated to a distance attribute value of 0-2 miles may comprise 9.9%, and is based on 1000 offers (99 acceptances from the 1000 offers for the second promotion). As discussed in more detail below, even though the first conversion rate is higher than the second conversion rate, the confidence in the first conversion rate is lower than the second conversion rate.

The additional offer engine 206 is configured to determine a number of additional offers to present to consumers in order to increase the confidence in the conversion rate (such as increase the confidence by a predetermined amount).

Figure 3:
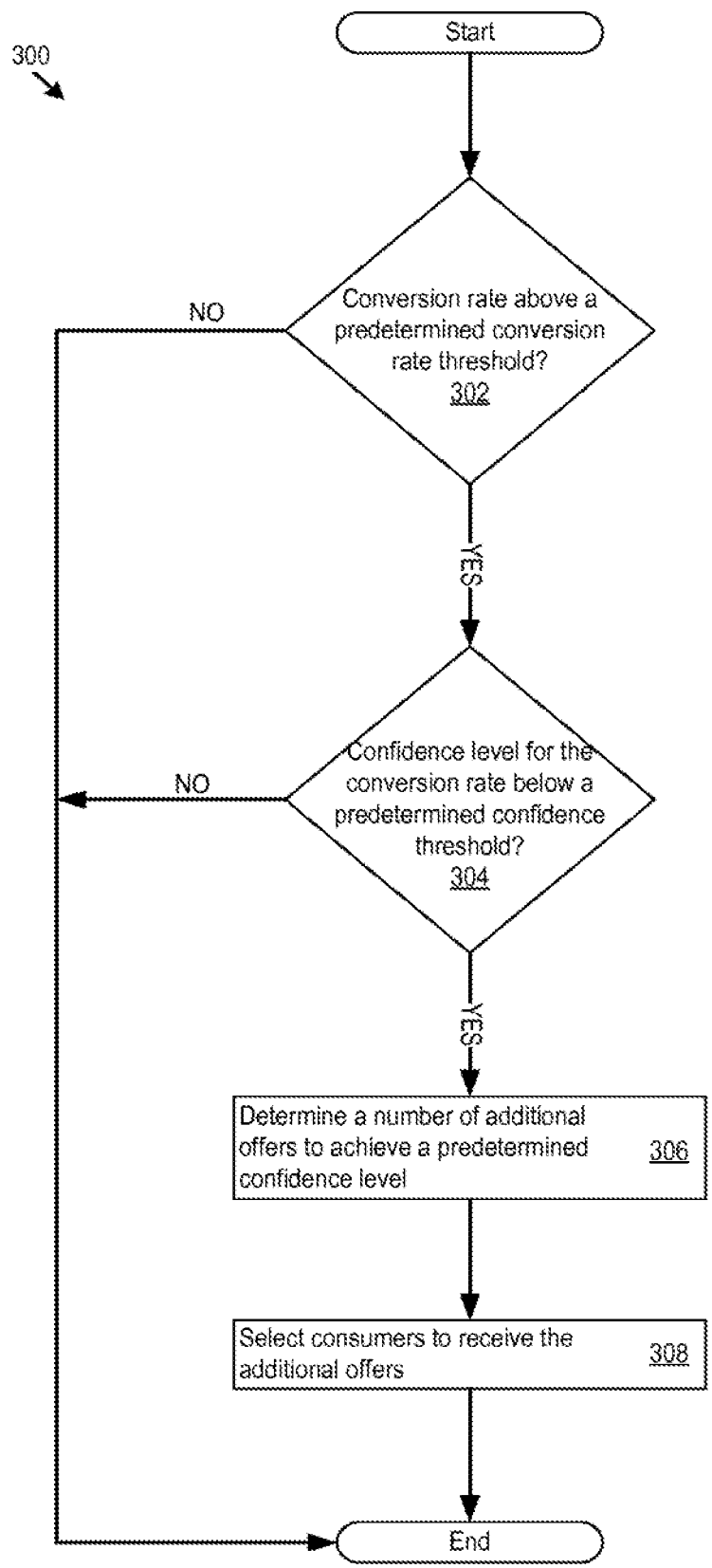
FIG. 3 illustrates a flow chart identifying one or more parts of a promotion program with potential but insufficient feedback data, and determining a number of additional offers to improve for the insufficient feedback data.

FIG. 3 illustrates a flow chart 300 identifying one or more parts of a promotion program with potential but with insufficient feedback data, and determining a number of additional offers to compensate for the insufficient feedback data. As discussed above, offers are presented for a promotion program. The offers result in feedback data that may be organized into the promotion program predictive model 202. Parts of the promotion program predictive model 202 may indicate potential success in the promotion. For example, a promotion program predictive model 202 organized by correlating values of attribute(s) with corresponding conversion rates may indicate potential success for certain values of the attribute(s).

At 302, it is determined whether the conversion rate is above a predetermined conversion rate threshold (e.g., indicative of potential success). For example, the predetermined conversion rate threshold may comprise an absolute number (e.g., 10% conversion rate). As another example, the predetermined conversion rate threshold may comprise a threshold number that varies depending on values of the attribute(s). In particular, in the example of a promotion program predictive model 202 organized by correlating values of distances between the consumer and the promotion program with corresponding conversion rates, different threshold numbers may be used depending on the value of the distance (e.g., 10% for 0-2 miles, 8% for 2-4 miles, 6% for 4-6 miles). As still another example, the predetermined conversion rate threshold may comprise a predetermined percentile for a value of the attribute in a particular geographic region. Again, using the promotion program predictive model 202 organized by correlating values of distances between the consumer and the promotion program with corresponding conversion rates, the predetermined conversion rate for 0-2 miles may comprise the $50^{th}$ percentile for promotion program 0-2 miles in the same city as the promotion program. Other indications of potential success of part of the promotion program are contemplated.

At 304, it is determined whether confidence in the conversion rate is below a predetermined confidence threshold. As discussed in more detail below, confidence in the conversion rate may be determined in several ways. Likewise, the predetermined confidence threshold may be represented in one of several ways. One way to measure confidence is to analyze the number of offers that are used to generate the conversion rate. In this regard, the predetermined confidence threshold may comprise an absolute number. Another way to measure confidence in the conversion rate is to analyze a potential distance of the conversion rate (as determined by the offers that have been received) versus an actual conversion rate. As discussed in more detail below, a promotion may have a given number of conversions (X) from a given number of offers (Y), which results in a conversion rate (cr). A measure of confidence may be determined in the calculated conversion rate (cr). For example, confidence intervals may be calculated such that there is an M % that the conversion rate (cr) is within the confidence intervals (e.g., there is a 95% confidence that the calculated conversion rate is within the confidence interval). In this regard, the confidence as represented by the confidence interval may vary based on the width of the confidence interval. For example, the wider the confidence interval (+/−20%), the lower the confidence in the conversion rate. Conversely, the narrower the confidence interval (+/−5%), the greater the confidence in the conversion rate. The confidence intervals may generally narrow as more offers are issued. Thus, the confidence interval for the conversion rate may be determined and compared with a predetermined confidence interval. In the event that the confidence interval is greater than the predetermined confidence interval (e.g., the confidence in the conversion rate is lower than a predetermined confidence threshold), the flow chart 300 proceeds to 306.

At 306, a number of additional offers to achieve a predetermined confidence level is determined. Additional offers may be determined in one of several ways. A non-limiting example is provided. A promotion program for certain value(s) of attribute(s) has X acceptances for Y offers that have already been sent. Thus, the empirical conversion rate is X/Y. Further, the total number of impressions Y' may be calculated such that the empirical conversion rate is within a predetermined percentage of the actual conversion rate. For example, the following equation calculates Y' to have the empirical conversion rate to be within 20% of the actual conversion rate:

$$Y' = c\_alpha^2/(0.2^2)/cr$$

where cr is the empirical conversion rate, and c_alpha is a constant that depends on alpha;

where alpha in the equation above is the predetermined probability that the conversion rate is within 20% of the actual conversion rate.

In this regard, the number of additional offers to present in order for empirical conversion rate to be within a predetermined percentage of the actual conversion rate is: number of additional offers=Y'−Y.

The 20% is merely for illustration purposes. Other percentages are contemplated. In this regard, different values of alpha may be used, such as 50%, so that the equation above, instead of using 0.2 may use 0.5. Further, as shown in the equation illustrated above, the number of additional offers may be dependent on cr (the empirical conversion rate). More specifically, the number of additional offers may be inversely related to the cr (empirical conversion rate). In this regard, for a higher cr, a lower number of additional offers may be needed for empirical conversion rate to be within a predetermined percentage of the actual conversion rate. Conversely, for a lower cr, a higher number of additional offers may be needed for empirical conversion rate to be within a predetermined percentage of the actual conversion rate.

At 308, the consumers to receive the additional offers are selected. The selection of consumers may be in accordance with the disclosure in U.S. application Ser. No. 13/411,502, incorporated by reference herein in its entirety. In the event that the number of additional offers is large, throttling may be used, such as disclosed in U.S. application Ser. No. 13/839,142 entitled "Throttling System for Consumer Deals", incorporated by reference herein in its entirety. Throttling may be used to meter the additional offers over a series of several time periods, such as over several days. In this regard, the determination as to the number of additional offers may be repeated, such as repeated after each day, as discussed in FIG. 4.

FIG. 3 illustrates a separate determination of the confidence level for the conversion rate. In one embodiment, a separate determination step may not be required. Instead, the calculation of the number of additional offers may serve as an indication of the confidence level. For example, in the event that the number of additional offers is greater than zero, then this serves as an indication that the confidence should be increased to the predetermined rate (e.g., 20% as discussed above). As another example, in the event that no additional offers are needed to have the predetermined confidence in the conversion rate, this indicates that the confidence level is at least the predetermined rate. Further, different sequences than the sequence illustrated in FIG. 3 may be implemented. For example, the determination that the conversion rate is above a predetermined conversion rate threshold may be made after the calculation of the number of additional offers.

Figure 4:
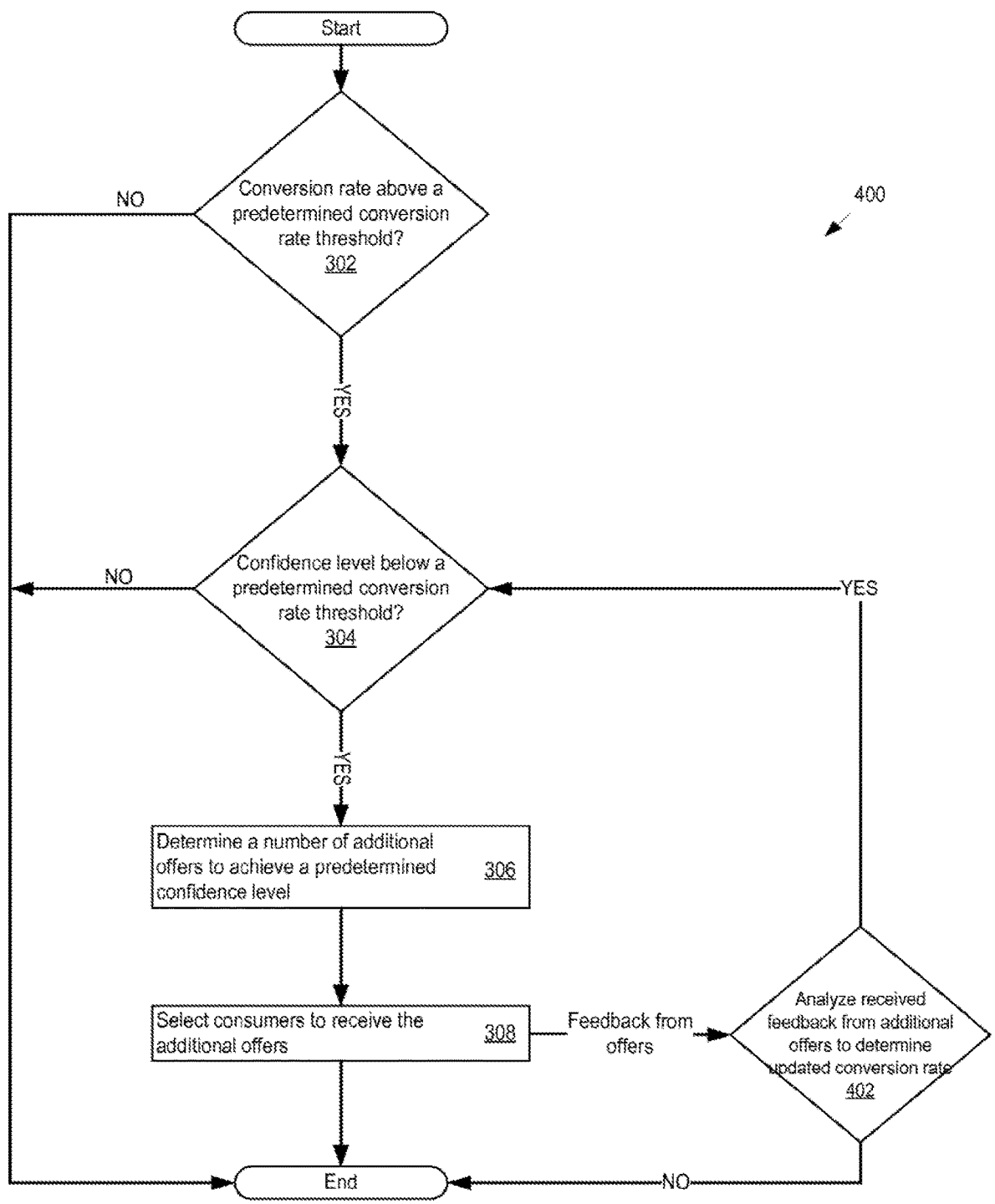
FIG. 4 illustrates an expanded flow chart of FIG. 3 in which the number of additional offers is determined iteratively.

FIG. 4 illustrates an expanded flow chart 400 of FIG. 3 in which the number of additional offers is determined iteratively. As discussed above, the number of additional offers may be determined. The additional offers may be presented over one or more periods of time. For example, in the instance where a period of time is one day, the additional offers may be presented over a span of several days. The offers presented in one period of time (such as the first day) may be used to re-calculate the conversion rate and re-calculate the number of additional offers to achieve the predetermined confidence level. Output from 308 is feedback data from some of the additional offers presented (such as for one period of time). At 402, it may be determined whether to analyze the feedback data to update the conversion rate. If so, the conversion rate may be updated based on the feedback data from the additional offers. Further, the flow chart 400 may loop back to 304 in order to update the number of additional offers to achieve the predetermined confidence level. In this regard, a previous period's additional offers (such as yesterday's additional offers) and the subsequent purchases may affect the present calculations.

As discussed above, additional offers may be transmitted over the course of several time periods, such as over several days. In this regard, the confidence in the conversion rate may be increased by issuing the additional offers. Further, the number of additional offers may be readjusted periodically, such as each day or after issuance of a predetermined number of additional offers sent. In addition, the number of additional offers may be readjusted based on the additional feedback data from the additional offers transmitted.

Figure 5:
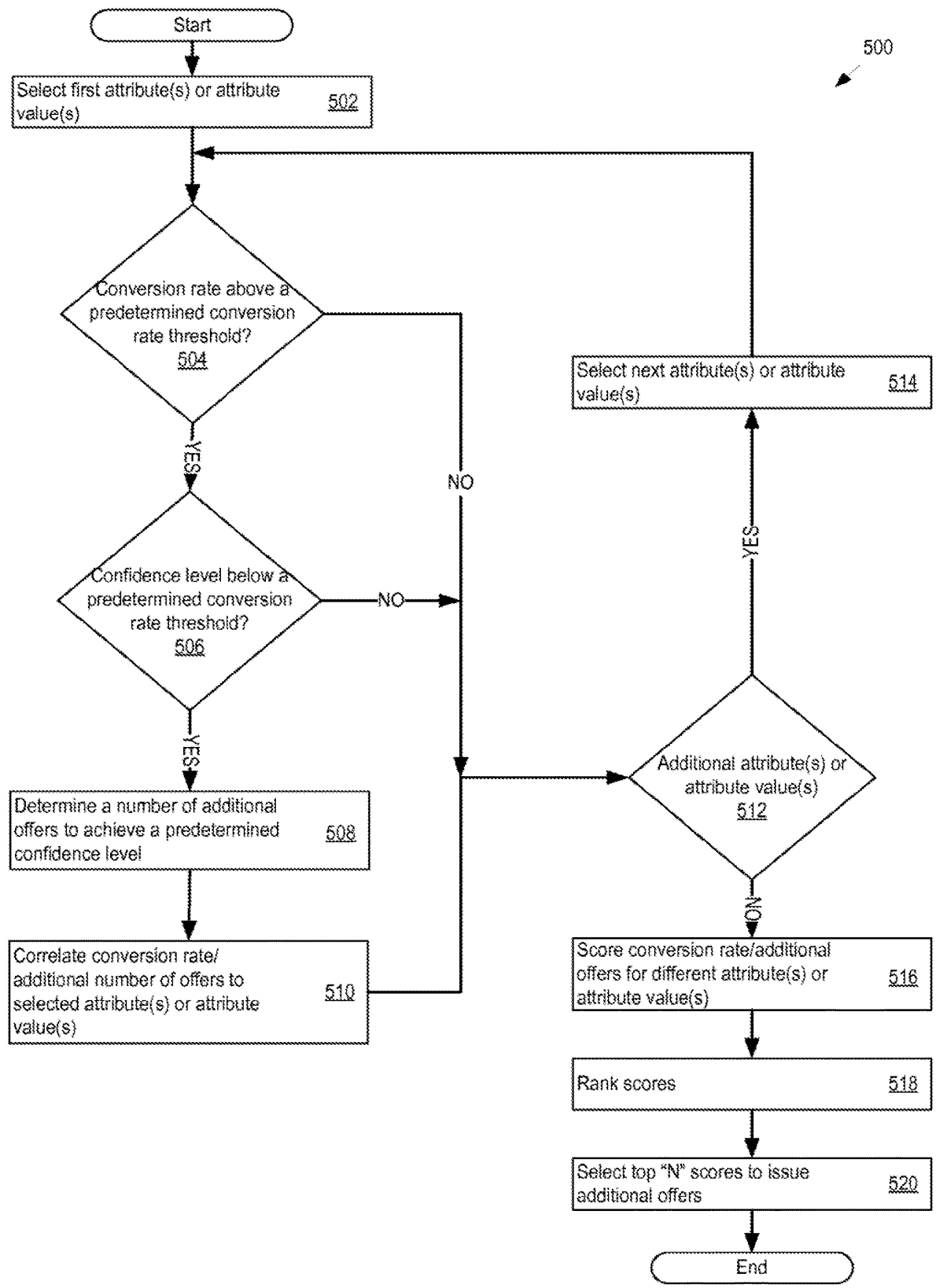
FIG. 5 illustrates a flow chart identifying a promotion program that has different attributes or different attribute values with potential but insufficient feedback data, determining a number of additional offers to improve for the insufficient feedback data for the different attributes or attribute values, and selecting which of the different attributes or attribute values to send additional offers.

FIG. 5 illustrates a flow chart 500 identifying a promotion program that has different attributes or different attribute values with potential but insufficient feedback data, determining a number of additional offers to improve for the insufficient feedback data for the different attributes or attribute values, and selecting which of the different attributes or attribute values to send additional offers. At 502, a first attribute or attribute value(s) are selected. As discussed above, one or multiple attributes may define a promotion program, such as the distance from the promotion program (derived from consumer attributes and promotion attributes), ages (e.g., 20-29, 30-39, 40-49, etc.), gender, etc. Different attributes, such as distance, ages, gender, may be examined. Also, different combinations of attributes may be examined, such as location/age, location/gender, location/age/gender. Further, different values within the examined attribute (or combinations of attributes) may be examined. For example, in examining the distance attribute, the different values of distance, such as 0-2 miles, 2-4 miles, etc. may individually be examined. In this regard, at 502, a first attribute or an attribute value is selected.

Flow chart 500 iterates through determining whether the selected attribute (or value of the attribute) is above a predetermined conversion rate threshold at 504, determining whether the confidence level is below a predetermined conversion rate threshold at 506, determining a number of additional offers to achieve a predetermined confidence level at 508, and correlate the conversion rate/additional number of offers to the selected attribute or selected attribute value at 510 (for further analysis at 516).

At 512, it is determined whether there are additional attributes or additional attribute values, and if so, the next attribute or attribute value is selected at 514, and flow chart 500 loops back to 504. In this regard, different values for an attribute (such as 0-2 miles, 2-4 miles, etc. may be evaluated for the distance attribute), different values for multiple attributes (such as 0-2 miles, 2-4 miles, etc. may be evaluated for the distance attribute; 20-29, 30-39, 40-49, etc. may be evaluated for the age attribute), different combinations of attributes (such as 0-2 miles/male, 0-2 miles/female, 2-4 miles/male, 2-4 miles/female, etc. may be evaluated for the distance/gender attributes) may be evaluated. The different values of attribute(s) and different combinations of attributes are merely for illustration purposes.

If there are no additional attributes or additional attribute values, the conversion rate/additional number of offers correlated at 510 may be evaluated. One example of evaluation is illustrated in FIG. 5 at 516-510.

At 516, the conversion rate/additional number of offers are scored for the different attribute(s) or attribute value(s). In general terms, the evaluation or scoring attempts to determine an effect in issuing additional offers for the attribute(s) or attribute value(s). In other words, issuing additional offers may increase the confidence in the determined conversion rate. In this regard, the effect of the increase in confidence for the attribute(s) or the attribute(s) under consideration may be compared.

Various factors may be used to determine the effect of the increase in confidence. Factors include, but are not limited to: the penalty associated with the lack of confidence; and the number of consumers affected by the penalty As discussed in more detail below, a reduced confidence in a conversion rate results in a penalty associated with the conversion rate. In the example of the distance attribute of 0-2 miles indicating a conversion rate of 10%, a reduced confidence results in a penalty so that the penalized or adjusted conversion rate is 2%, as discussed below with regard to FIG. 6. Thus, the gap in confidence is 8%. The effect of the 8% gap may be greater quantified by combining the gap with the pool of users that include the attribute. In the example of the distance attribute of 0-2 miles, the number of consumers that meet this attribute (e.g., 100,000 consumers) multiplied by the gap in confidence may be one example of the measure, or score. In this regard, a gap of 8% for 100,000 consumers results in 8,000 potential additional conversions. Conversely, if the number of consumers that meet the attribute are 100 consumers, the gap of 8% for 100 consumers results in 8 potential additional conversions. In this manner, the effect of the increase in confidence may be quantified and compared. Other indications of the effect of the increase in confidence are contemplated.

At 518, the scores are ranked. At 520, the top "N" scores are selected to issue additional offers. In one example, "N"=1, so that top score is selected. As another example, "N">1.

Though not illustrated in FIG. 5, once the top "N" scores are selected, the consumers may be selected to receive the additional offers. In this regard, the additional offers may be sent over the course of several time periods. Thus, as discussed in FIG. 4, the feedback from the additional offers may be used to reevaluate the confidence level. For example, resulting from the analysis illustrated in FIG. 5, the system determines that "Q" additional offers be issued in 0-2 mile distance attribute and "R" additional offers be issued in the 4-6 mile distance attribute. Issuing some of the "Q" additional offers for the 0-2 mile distance attribute results in feedback, which may affect the confidence level in the conversion rate associated with the 0-2 mile distance attribute, and in turn the number of additional offers (e.g., potentially resulting in a change from the initial decision to issue "Q" additional offers).

Figure 6:
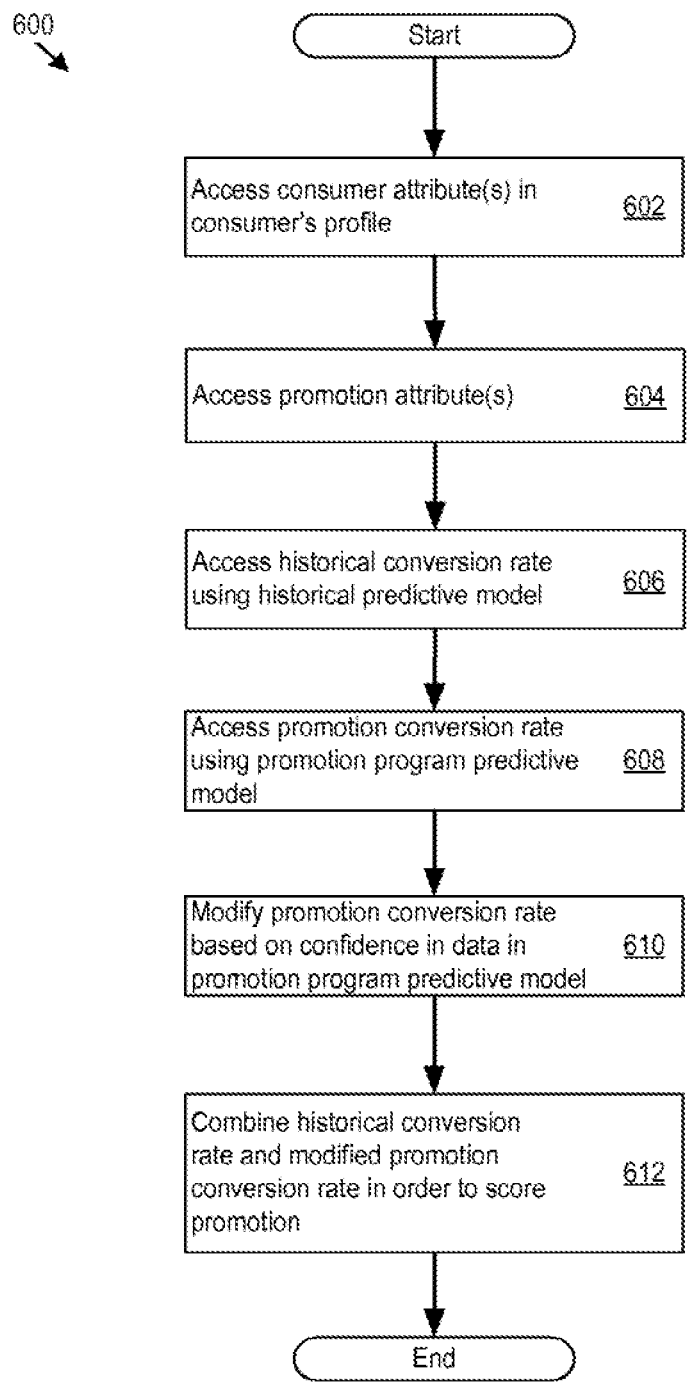
FIG. 6 illustrates a flow chart for determining an adjustment to a promotion conversion rate based on confidence in the performance data used to generate the promotion conversion rate.

FIG. 6 illustrates a flow chart 600 for determining an adjustment to a promotion conversion rate based on confidence in the performance data used to generate the promotion conversion rate. In one embodiment, a promotion conversion rate may be adjusted to penalize the conversion rate for reduced or low confidence. In this regard, as the feedback data is increased (such as by issuing additional offers), the confidence in the promotion conversion rate may increase, thereby decreasing the penalty.

At 602, a consumer attribute or multiple consumer attributes are accessed from a consumer profile. At 604, a promotion attribute or multiple promotion attributes are accessed. At 606, the historical conversion rate is accessed from the historical predictive model 204. At 608, the promotion conversion rate is accessed from the promotion program predictive model 202.

At 610, the promotion conversion rate is modified based on the confidence in the data in the promotion program predictive model. The modification may be performed in one of several ways. One way is to determine modifying the promotion conversion rate such that there is a predetermined probability that the actual conversion rate is greater than the modified promotion conversion rate. For example, if a promotion has X purchases (e.g., conversions) for Y offers, the modified conversion rate s is as follows:

$$s = X/Y - c\_alpha * X^{(0.5)/Y};$$

where c_alpha is a constant that depends on alpha; and
where alpha is the probability that the actual conversion rate is greater than s.

Other ways are contemplated to modify the promotion conversion rate, such as modifying the promotion conversion rate so that there is an alpha probability that the actual conversion rate is within a range of (rather than greater than) the modified promotion conversion rate.

As discussed in examples above, the conversion rate may be measured as 10%. However, due to the reduced confidence in the conversion rate, using the equation listed above, a penalty may be levied so that the conversion rate may be adjusted downward to 2%, with the gap of 8% representing a gap in the confidence in the conversion rate.

At 612, the historical conversion rate and the modified promotion conversion rate are combined in order to score the promotion. The combination of the historical conversion rate with the modified promotion conversion rate may comprise weighting the two rates and combining them (such as by multiplying both by 0.5 and adding them together).

FIG. 7 illustrates a general computer system 700, programmable to be a specific computer system 700, which can represent any server, computer or component, such as consumer 1 (124), consumer N (126), merchant 1 (118), merchant M (120), and promotion program offering system 102. The computer system 700 may include an ordered listing of a set of instructions 702 that may be executed to cause the computer system 700 to perform any one or more of the methods or computer-based functions disclosed herein. The computer system 700 can operate as a stand-alone device or can be connected, e.g., using the network 122, to other computer systems or peripheral devices.

In a networked deployment, the computer system 700 can operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 700 can include a memory 703 on a bus 710 for communicating information. Code operable to cause the computer system to perform any of the acts or operations described herein can be stored in the memory 703. The memory 703 may be a random-access memory, read-only memory, programmable memory, hard disk drive or any other type of volatile or non-volatile memory or storage device.

The computer system 700 can include a processor 701, such as a central processing unit (CPU) and/or a graphics processing unit (GPU). The processor 701 may include one or more general processors, digital signal processors, application specific integrated circuits, field programmable gate arrays, digital circuits, optical circuits, analog circuits, combinations thereof, or other now known or later-developed devices for analyzing and processing data. The processor 701 may implement the set of instructions 702 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 700 can also include a disk or optical drive unit 704. The disk drive unit 704 may include a computer-readable medium 705 in which one or more sets of instructions 702, e.g., software, may be embedded. Further, the instructions 702 may perform one or more of the operations as described herein. The instructions 702 may reside completely, or at least partially, within the memory 703 or within the processor 701 during execution by the computer system 700. Accordingly, the databases 110, 112, 114, or 116 may be stored in the memory 703 or the disk unit 704.

The memory 703 and the processor 701 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 700 may include an input device 707, such as a keyboard or mouse, configured for a user to interact with any of the components of system 700. It may further include a display 706, such as a liquid crystal display (LCD), a cathode ray tube (CRT), or any other display suitable for conveying information. The display 706 may act as an interface for the user to see the functioning of the processor 701, or specifically as an interface with the software stored in the memory 703 or the drive unit 704.

The computer system 700 may include a communication interface 708 that enables communications via the communications network 122. The network 122 may include wired networks, wireless networks, or combinations thereof. The communication interface 708 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion program offering system 102, as depicted in FIG. 1 may comprise one computer system or multiple computer systems. Further, the flow diagrams illustrated in FIGS. 3-6 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method comprising:
    accessing, via a processor, a database configured for storing feedback data received from a plurality of consumer devices in response to the consumer devices having previously received an electronic communication comprising an offer,
    wherein the offer, previously sent to each of the plurality of consumer devices via the electronic communication, is comprised of at least a first attribute, a value of which is specific to each consumer device,
    wherein the feedback data is received from each consumer device to which the offer was provided and is data indicative of at least one action that was taken in response to having previously received the electronic communication comprising the offer, the at least one action including one of (i) not opening the electronic communication, (ii) opening the electronic communication and not buying the offer included therein, or (iii) opening the electronic communication and buying the offer, and
    wherein the database compiles the feedback data that is received from each of the plurality of consumer devices and is comprised of an indication of the at least one action taken by a particular consumer device of the plurality of consumer devices and an indication indicative of at least a first attribute value or the second attribute value, and
    wherein the database is organized and correlated to one or more attribute values such that each value of a particular attribute is correlated to a determined conversion rate;
    analyzing, via a processor, the feedback data, wherein analyzing the feedback data comprises:
        determining, based on the analysis, and from the accessed data, a first estimated number of offer acceptances correlated to the first attribute value and a second estimated number of offer acceptances correlated to the second attribute value; and
        determining that each of the first estimated number of offer acceptances and the second estimated number of offer acceptances are above a predetermined acceptance threshold;
    subsequent to the determination that each of the first estimated number of offer acceptances and the second estimated number of offer acceptances are above the predetermined acceptance threshold, determining that at least one of the first estimated number of offer acceptances or the second estimated number of offer acceptances fails to meet a predetermined conversion rate threshold;
    in an instance in which the first estimated number of offer acceptances fails to meet the predetermined conversion rate threshold, determining a number of additional offers correlated to the first attribute value needed to be sent to make the first estimated number of offer acceptances increase to meet the predetermined conversion rate threshold;
    in an instance in which the second estimated number of offer acceptances fails to meet the predetermined conversion rate threshold, determining a number of additional offers correlated to the second attribute value needed to be sent to make the second estimated number of offer acceptances increase to meet the predetermined conversion rate threshold; and
    providing, via electronic communication to one or more additional consumer devices, in real-time, a portion of the number of additional offers during a first time period.

2. The method of claim 1, further comprising:
    receiving additional feedback data associated with the portion of number of additional offers;
    re-calculating the first estimated number of offer acceptances and the second estimated number of offer acceptances;
    re-determining that at least one of the first estimated number of offer acceptances and the second estimated number of offer acceptances fails to meet the predetermined conversion rate threshold; and
    re-calculating the number of additional offers correlated to at least one of the first attribute value and the second attribute value needed to be sent to make the first estimated number of offer acceptances and the second estimated number of offer acceptances meet the predetermined conversion rate threshold.

3. The method of claim 1, wherein the electronic communication comprises at least one of a text message or a mobile push notification.

4. The method of claim 1, wherein determining the number of additional offers correlated to the first attribute value needed to be sent to make the first estimated number of offer acceptances increase to meet the predetermined conversion rate threshold comprises: determining the number of additional offers correlated to the first attribute value needed to be sent to make the first estimated number of offer acceptances increase by at least a predetermined amount.

5. The method of claim 1, wherein the number of additional offers correlated to the first attribute value needed to be sent to make the first estimated number of offer acceptances increase to meet the predetermined conversion rate threshold is selected so that the number of additional offers correlated to the first attribute value is within a predetermined percentage of an actual number of offer acceptances.

6. The method of claim 1, wherein the first attribute includes a plurality of attribute values, wherein determining, based on the analysis, a first estimated number of offer acceptances comprises determining, based on the analysis, the first estimated number of offer acceptances correlated to each of the plurality of attribute values of the first attribute.

7. The method of claim 1, wherein the first attribute is indicative of a distance of the consumer device to a location associated with the offer; and
wherein a minimum number varies depending on a value of the distance of the consumer to the location associated with the offer.

8. The method of claim 1, wherein the first attribute is a geographic area;
wherein the first attribute includes a plurality of attribute values;
wherein the predetermined conversion rate threshold comprises a conversion rate that is a predetermined percentile of conversion rates for each of the plurality of attribute values for promotion programs in the geographic area.

9. A computer program product comprising at least one non-transitory computer-readable storage medium having computer-executable program code instructions stored therein, the computer-executable program code instructions comprising program code instructions for:
accessing, via a processor, a database configured for storing feedback data received from a plurality of consumer devices in response to the consumer devices having previously received an electronic communication comprising an offer,
wherein the offer, previously sent to each of the plurality of consumer devices via the electronic communication, is comprised of at least a first attribute, a value of which is specific to each consumer device,
wherein the feedback data is received from each consumer device to which the offer was provided and is data indicative of at least one action that was taken in response to having previously received the electronic communication comprising the offer, the at least one action including one of (i) not opening the electronic communication, (ii) opening the electronic communication and not buying the offer included therein, or (iii) opening the electronic communication and buying the offer, and
wherein the database compiles the feedback data that is received from each of the plurality of consumer devices and is comprised of an indication of the at least one action taken by a particular consumer device of the plurality of consumer devices and an indication indicative of at least a first attribute value or the second attribute value, and
wherein the database is organized and correlated to one or more attribute values such that each value of a particular attribute is correlated to a determined conversion rate;
analyzing, via a processor, the feedback data, wherein analyzing the feedback data comprises:
determining, based on the analysis, and from the accessed data, a first estimated number of offer acceptances correlated to the first attribute value and a second estimated number of offer acceptances correlated to the second attribute value; and
determining that each of the first estimated number of offer acceptances and the second estimated number of offer acceptances are above a predetermined acceptance threshold;
subsequent to the determination that each of the first estimated number of offer acceptances and the second estimated number of offer acceptances are above the predetermined acceptance threshold, determining that at least one of the first estimated number of offer acceptances or the second estimated number of offer acceptances fails to meet a predetermined conversion rate threshold;
in an instance in which the first estimated number of offer acceptances fails to meet the predetermined conversion rate threshold, determining a number of additional offers correlated to the first attribute value needed to be sent to make the first estimated number of offer acceptances increase to meet the predetermined conversion rate threshold;
in an instance in which the second estimated number of offer acceptances fails to meet the predetermined conversion rate threshold, determining a number of additional offers correlated to the second attribute value needed to be sent to make the second estimated number of offer acceptances increase to meet the predetermined conversion rate threshold; and
providing, via electronic communication to one or more additional consumer devices, in real-time, a portion of the number of additional offers during a first time period.

10. The computer program product of claim 9, wherein the computer-executable program code instructions further comprise program code instructions for:
receiving additional feedback data associated with the portion of number of additional offers;
re-calculating the first estimated number of offer acceptances and the second estimated number of offer acceptances;
re-determining that at least one of the first estimated number of offer acceptances and the second estimated number of offer acceptances fails to meet the predetermined conversion rate threshold; and
re-calculating the number of additional offers correlated to at least one of the first attribute value and the second attribute value needed to be sent to make the first estimated number of offer acceptances and the second estimated number of offer acceptances meet the predetermined conversion rate threshold.

11. The computer program product of claim 9, wherein the electronic communication comprises at least one of a text message or a mobile push notification.

12. The computer program product of claim 9, wherein determining the number of additional offers correlated to the first attribute value needed to be sent to make the first estimated number of offer acceptances increase to meet the predetermined conversion rate threshold comprises: determining the number of additional offers correlated to the first attribute value needed to be sent to make the first estimated number of offer acceptances increase by at least a predetermined amount.

13. The computer program product of claim 9, wherein the number of additional offers correlated to the first attribute value needed to be sent to make the first estimated number of offer acceptances increase to meet the predetermined conversion rate threshold is selected so that the number of additional offers correlated to the first attribute value is within a predetermined percentage of an actual number of offer acceptances.

14. The computer program product of claim 9, the first attribute includes a plurality of attribute values, wherein determining, based on the analysis, a first estimated number of offer acceptances comprises determining, based on the analysis, the first estimated number of offer acceptances correlated to each of the plurality of attribute values of the first attribute.

15. The computer program product of claim 9, wherein the first attribute is indicative of a distance of the consumer device to a location associated with the offer; and
   wherein a minimum number varies depending on a value of the distance of the consumer to the location associated with the offer.

16. The computer program product of claim 9, wherein the first attribute is a geographic area;
   wherein the first attribute includes a plurality of attribute values;
   wherein the predetermined conversion rate threshold comprises a conversion rate that is a predetermined percentile of conversion rates for each of the plurality of attribute values for promotion programs in the geographic area.

17. An apparatus comprising at least one processor and at least one memory including computer program code, the at least one memory and the computer program code configured to, with the processor, cause the apparatus to at least:
   access, via a processor, a database configured for storing feedback data received from a plurality of consumer devices in response to the consumer devices having previously received an electronic communication comprising an offer,
   wherein the offer, previously sent to each of the plurality of consumer devices via the electronic communication, is comprised of at least a first attribute, a value of which is specific to each consumer device,
   wherein the feedback data is received from each consumer device to which the offer was provided and is data indicative of at least one action that was taken in response to having previously received the electronic communication comprising the offer, the at least one action including one of (i) not opening the electronic communication, (ii) opening the electronic communication and not buying the offer included therein, or (iii) opening the electronic communication and buying the offer, and
   wherein the database compiles the feedback data that is received from each of the plurality of consumer devices and is comprised of an indication of the at least one action taken by a particular consumer device of the plurality of consumer devices and an indication indicative of at least a first attribute value or the second attribute value, and
   wherein the database is organized and correlated to one or more attribute values such that each value of a particular attribute is correlated to a determined conversion rate;
   analyze, via a processor, the feedback data, wherein analyzing the feedback data comprises:
      determining, based on the analysis, and from the accessed data, a first estimated number of offer acceptances correlated to the first attribute value and a second estimated number of offer acceptances correlated to the second attribute value; and
      determining that each of the first estimated number of offer acceptances and the second estimated number of offer acceptances are above a predetermined acceptance threshold;
   subsequent to the determination that each of the first estimated number of offer acceptances and the second estimated number of offer acceptances are above the predetermined acceptance threshold, determining that at least one of the first estimated number of offer acceptances or the second estimated number of offer acceptances fails to meet a predetermined conversion rate threshold;
   in an instance in which the first estimated number of offer acceptances fails to meet the predetermined conversion rate threshold, determine a number of additional offers correlated to the first attribute value needed to be sent to make the first estimated number of offer acceptances increase to meet the predetermined conversion rate threshold;
   in an instance in which the second estimated number of offer acceptances fails to meet the predetermined conversion rate threshold, determine a number of additional offers correlated to the second attribute value needed to be sent to make the second estimated number of offer acceptances increase to meet the predetermined conversion rate threshold; and
   provide, via electronic communication to one or more additional consumer devices, in real-time, a portion of the number of additional offers during a first time period.

18. The apparatus according to claim 17, wherein the at least one memory and the computer program code are further configured to, with the processor, cause the apparatus to:
   receive additional feedback data associated with the portion of number of additional offers;
   re-calculate the first estimated number of offer acceptances and the second estimated number of offer acceptances;
   re-determine that at least one of the first estimated number of offer acceptances and the second estimated number of offer acceptances fails to meet the predetermined conversion rate threshold; and
   re-calculate the number of additional offers correlated to at least one of the first attribute value and the second attribute value needed to be sent to make the first estimated number of offer acceptances and the second estimated number of offer acceptances meet the predetermined conversion rate threshold.

19. The apparatus according to claim 17, wherein the electronic communication comprises at least one of a text message or a mobile push notification.

20. The apparatus according to claim 17, wherein determining the number of additional offers correlated to the first attribute value needed to be sent to make the first estimated number of offer acceptances increase to meet the predetermined conversion rate threshold comprises: determining the number of additional offers correlated to the first attribute value needed to be sent to make the first estimated number of offer acceptances increase by at least a predetermined amount.

21. The apparatus according to claim 17, wherein the number of additional offers correlated to the first attribute value needed to be sent to make the first estimated number of offer acceptances increase to meet the predetermined conversion rate threshold is selected so that the number of additional offers correlated to the first attribute value is within a predetermined percentage of an actual number of offer acceptances.

22. The apparatus according to claim 17, wherein the first attribute includes a plurality of attribute values, wherein determining, based on the analysis, a first estimated number of offer acceptances comprises determining, based on the analysis, the first estimated number of offer acceptances correlated to each of the plurality of attribute values of the first attribute.

23. The apparatus according to claim 17, wherein the first attribute is indicative of a distance of the consumer device to a location associated with the offer; and
   wherein a minimum number varies depending on a value of the distance of the consumer to the location associated with the offer.

24. The apparatus according to claim 17, wherein the first attribute is a geographic area;
   wherein the first attribute includes a plurality of attribute values;
   wherein the predetermined conversion rate threshold comprises a conversion rate that is a predetermined percentile of conversion rates for each of the plurality of attribute values for promotion programs in the geographic area.

* * * * *